(12) United States Patent
Hoheisel (10) Patent No.: US 12,126,210 B2
(45) Date of Patent: Oct. 22, 2024

(54) PHOTOVOLTAIC ARRAY FOR OPERATION UNDER NON-UNIFORM ILLUMINATION WITH ADJUSTABLE VOLTAGE OUTPUT

(71) Applicant: Raymond Hoheisel, Arlington, VA (US)

(72) Inventor: Raymond Hoheisel, Arlington, VA (US)

( * ) Notice: Subject to any disclaimer, the term of this patent is extended or adjusted under 35 U.S.C. 154(b) by 0 days.

(21) Appl. No.: 18/065,412

(22) Filed: Dec. 13, 2022

(65) Prior Publication Data

US 2023/0187962 A1 Jun. 15, 2023

Related U.S. Application Data

(60) Provisional application No. 63/289,751, filed on Dec. 15, 2021.

(51) Int. Cl.
*H02J 7/35* (2006.01)
*H02J 7/00* (2006.01)
*H02S 10/20* (2014.01)

(52) U.S. Cl.
CPC .............. *H02J 7/35* (2013.01); *H02J 7/0068* (2013.01); *H02S 10/20* (2014.12)

(58) Field of Classification Search
CPC .......................................................... H02J 7/35
USPC ........................................................... 307/19
See application file for complete search history.

(56) References Cited

U.S. PATENT DOCUMENTS

| | | | |
|---|---|---|---|
| 4,023,368 A | 5/1977 | Kelly | |
| 4,643,545 A | 2/1987 | Vanderwall | |
| 5,714,773 A | 2/1998 | Burrows et al. | |
| 9,548,626 B1 * | 1/2017 | Ramirez | H02J 7/35 |
| 10,825,944 B2 | 11/2020 | Kare et al. | |
| 2008/0017239 A1 | 1/2008 | Tillotson | |

FOREIGN PATENT DOCUMENTS

| | | |
|---|---|---|
| WO | 2010059873 A2 | 5/2010 |
| WO | 2021/126927 A1 | 6/2021 |

* cited by examiner

*Primary Examiner* — Joseph Chang
(74) *Attorney, Agent, or Firm* — Banner & Witcoff, Ltd.

(57) ABSTRACT

A method, system, and apparatus for optical to electrical energy conversion by a photovoltaic array under non-uniform illumination is provided. A photovoltaic array comprises photovoltaic elements, each being associated with at least one corresponding electrical charge storage element. First and second photovoltaic elements may be respectively connected to first and second electrical charge storage elements. The first photovoltaic element may charge the first electrical charge storage element to a first voltage, and the second photovoltaic element may charge the first electrical charge storage element to a second voltage. After determining that the first and second voltages are respectively within a defined range across the first and second electrical charge storage elements, the first and second electrical charge storage elements may be connected and the connected first and second electrical charge storage elements may be coupled to provide energy to an electrical load.

12 Claims, 7 Drawing Sheets

PHOTOVOLTAIC ARRAY FOR OPERATION UNDER NON-UNIFORM ILLUMINATION WITH ADJUSTABLE VOLTAGE OUTPUT

CROSS REFERENCE TO RELATED APPLICATIONS

This application claims priority to U.S. provisional Patent Application Ser. No. 63/289,751, filed Dec. 15, 2021, the contents of which are expressly incorporated herein by reference in their entirety for all purposes.

FIELD

Aspects described herein generally relate to the fields of photovoltaic energy conversion, photovoltaic systems, and laser-based power beaming applications. More specifically, aspects described herein provide a photovoltaic receiver capable for operation under non-uniform illumination and methods for optical to electrical energy conversion using a photovoltaic element, an electrical charge storage element, a switching element, control electronics, and a housing.

BACKGROUND

The optical conversion efficiency of photovoltaics has routinely been reported to be above 50% when illuminated by a laser having a wavelength closely matched to the bandgap energy of a photovoltaic element. The high conversion efficiency makes it attractive to use a laser as a transmitter and a photovoltaic element as a receiver to transfer electrical energy between two locations, often also referred to as laser power beaming. This holds in particular for applications where electrical energy has to be transferred between locations (a) ad-hoc, (b) without the usage of electrical wires, (c) without radio-frequency signatures or interference, (d) with low probability of intercept, and (e) over distances of up to several kilometers.

Commercially off-the-shelf high-power lasers in the 1-micrometer wavelength range are available with near-diffraction limited performance and are well suited to illuminate a photovoltaic receiver over long distances of several kilometers. Without considering atmospheric effects, such as in space or in a vacuum, the intensity profile of the laser beam at the location of the photovoltaic receiver can generally be described by a quasi-Gaussian/Airy distribution. Under the influence of atmospheric turbulence, however, beam distortion effects such as lensing, scintillation, or beam wander may occur which can lead to significant spatial and temporal modifications of the intensity distribution of the laser beam at the location of the photovoltaic receiver. Spatial modifications of the intensity distribution can cause the intensity at any one spot on the photovoltaic receiver to easily be a magnitude higher or lower than it would be without the presence of atmospheric turbulence. On a temporal scale these fluctuations can occur at frequencies of both less and more than 100 Hz.

The spatial and temporal fluctuation of the laser beam intensity usually poses significant challenges to the design of the photovoltaic receiver for free-space optical (e.g., laser) power beaming applications. Aspects described herein may address these and other problems, and generally improve the reliability, efficiency, and cost of laser power beaming systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may overcome certain current challenges of the design of a photovoltaic-based laser power beaming receiver and provide a solution that allows incoming laser beams characterized by spatial and temporal intensity fluctuations to be reliably converted into electrical power.

Aspects described herein may include a photovoltaic element such as a photovoltaic receiver, an electrical charge and/or electrical energy storage element, a switching element, control electronics, and a housing. Other aspects herein may include a voltage meter or detector, or a temperature sensor.

According to various aspects of the disclosure, a method, system, and apparatus for optical to electrical energy conversion by a photovoltaic array under non-uniform illumination may be provided. The photovoltaic array comprises a plurality of photovoltaic elements, each photovoltaic element may be associated with at least one corresponding electrical charge storage element. The method may include connecting a first electrical charge storage element to a first photovoltaic element, charging, by the first photovoltaic element, the first electrical charge storage element to a first voltage, and determining that the first voltage is within a defined range across the first electrical charge storage element. connecting a second electrical charge storage element to a second photovoltaic element, charging, by the second photovoltaic element, the second electrical charge storage element to a second voltage, and determining the second voltage is within a defined range across the second electrical charge storage element. Further, the method may comprise connecting the first electrical charge storage element to the second electrical charge storage element such that the voltage across the first electrical charge storage element and the second electrical charge storage element is at least one of a sum of the first voltage across the first electrical charge storage element and the second voltage across the second electrical charge storage element, or larger than a minimum level of the first voltage across the first electrical charge storage element and the second voltage across the second electrical charge storage element. Also, the method may further include coupling the connected first electrical charge storage element and the second electrical charge storage element to an electrical load.

In some aspects, the first electrical charge storage element and the second electrical charge storage element may be comprised of at least one of the following: a capacitor, a battery, or an inductor. In various aspects, the first photovoltaic element and the second photovoltaic element may be non-contiguously disposed in the photovoltaic array. In other aspects, the first photovoltaic element and the second photovoltaic element are disposed in the photovoltaic array in different rows and different columns from each other.

In some aspects, the second electrical charge storage element may comprise a combination of electrical charge storage elements, which are configured to be both sequentially or simultaneously charged by the second photovoltaic element. In these aspects, the method may further comprise determining to charge, by the second photovoltaic element, the electrical charge storage elements in the combination sequentially or simultaneously to obtain a voltage within a desired voltage output range, and providing the voltage to the electrical load.

According to certain aspects, the method may, after connecting the first electrical charge storage element to the second electrical charge storage element, determining that the first electrical charge storage element and the second electrical charge storage element are no longer able to continue providing a voltage amount sufficient for the electrical load, and decoupling the first electrical charge storage element and the second electrical charge storage element from the electrical load. In further aspects, the method may comprise connecting a third electrical charge storage element to a fourth electrical charge storage element, and coupling the connected third electrical charge storage element and the fourth electrical charge storage element to the electrical load. In certain aspects, the voltage across the third electrical charge storage element and the fourth electrical charge storage element is at least one of a sum of a third voltage across the third electrical charge storage element and a fourth voltage across the fourth electrical charge storage element, or larger than a minimum level of the third voltage across the third electrical charge storage element and the fourth voltage across the fourth electrical charge storage element.

Applications include, but are not limited to, systems which are operated in remote locations, which are electrically powered, and which require a temporal or permanent external electrical power source. Other applications include systems for which batteries as the only power source impose operational limitations. Typical examples for such applications are: unmanned aerial vehicles, unmanned ground vehicles, unmanned marine vehicles, or remotely operated battery charging systems. Yet other applications include laser power beaming systems which are intended to be operated under exposure to very high intensity laser beams. Still other applications include outdoor photovoltaic systems which are operated under highly fluctuation illumination conditions. This can include rucksack integrated photovoltaic systems when operated under a canopy or when operated during frequently changing orientations with respect to the sun. Further applications include photovoltaic arrays which are integrated into automotive roofs and which are operated under highly fluctuation illumination conditions such as city canyons.

Some illustrative advantages of a photovoltaic array configured to operate under non-uniform illumination with adjustable voltage output comprise: (a) suitability for very high intensity laser power beaming applications characterized by a laser beam with a high degree of temporal and/or spatial fluctuation at the location of the photovoltaic receiver, (b) compatibility with photovoltaic elements made of different semiconductors, such as silicon (Si) or III-V materials, (c) dynamic adjustability of the voltage output of the photovoltaic receiver, (d) tolerance against laser misalignments, such as off-center illumination, (e) capability of feedback to the laser emitter for auto-alignment, and (f) low cost of fabrication.

BRIEF DESCRIPTION OF THE DRAWINGS

The present disclosure is illustrated by way of example and not limited in the accompanying figures in which like reference numerals indicate similar elements and in which.

DETAILED DESCRIPTION

Example and illustrative apparatuses, methods and systems are described herein. Any illustrative embodiment or feature described herein is not necessarily to be construed as preferred or advantageous over other embodiments, aspects or features. The illustrative embodiments and aspects described herein are not meant to be limiting. It will be readily understood that certain aspects of the disclosed apparatuses, systems and methods can be arranged and combined in a wide variety of different configurations, all of which are contemplated herein.

Furthermore, the particular arrangements shown in the Figures should not be viewed as limiting. It should be understood that other embodiments and/or aspects may include more or less of each element shown in a given Figure. Further, some of the illustrated elements may be combined, split into multiple components/steps, or omitted. Still further, one or more illustrative embodiments may include elements that are not explicitly illustrated in the Figures.

Aspects described herein may provide illustrative apparatuses, methods, and systems for a photovoltaic receiver array configured to operate under non-uniform illumination and with the capability of variable voltage output. The apparatuses, methods and systems may be used in diverse defense, aerospace, transportation, electrical vehicle charging and environmental monitoring applications. The apparatuses, methods and systems may also be used for laser power beaming applications.

Aspects and features described in the following combine (a) the electrical energy generation capability of one or more photovoltaic elements, and (b) the electrical charge and/or electrical energy flow controlling capability of electrical charge storage elements, electrical connectors, and electrical switching elements. The arrangement of the photovoltaic elements, the electrical charge storage elements, the electrical switching elements, and the electrical connectors may substantially reduce the typical negative impact of spatial and temporal fluctuations of the illumination intensity upon a photovoltaic receiver array. Such reduction of spatial and temporal fluctuations may lead to improved overall system efficiency and reliability. Further, the voltage output of the photovoltaic array can be dynamically adjusted.

Figure 1:
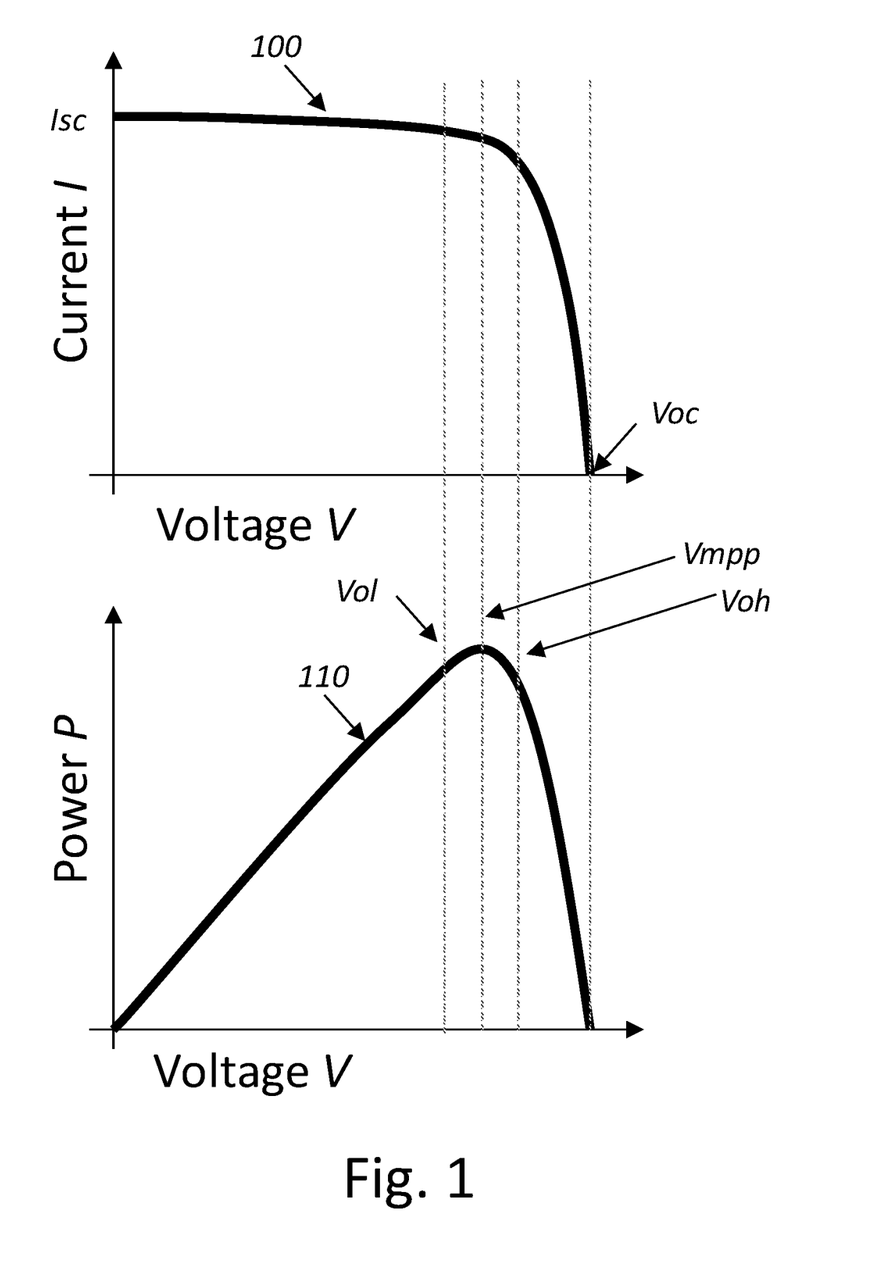
FIG. 1 illustrates the current vs. voltage (I-V curve) characteristic and the power vs. voltage (P-V curve) characteristic of a photovoltaic element according to illustrative aspects of the disclosure.

FIG. 1 shows an illustrative embodiment of a photovoltaic array for operation under non-uniform illumination with adjustable voltage output according to aspects of the disclosure. Electric power generated by a photovoltaic (PV) element is a function of the current (I) and voltage (V) characteristics. In particular, the product of the voltage and current is the power. FIG. 1 shows the current vs. voltage (I-V curve) characteristics 100 and the voltage vs. power characteristics 110 of a photovoltaic element according to aspects of the disclosure. It is known that varying an electrical load connected to a PV element from an open circuit to short circuit produces the I-V curve depicted in FIG. 1. The points at which the I-V curve intersects with the current and voltage axes are the short-circuit current Isc and open-circuit voltage Voc, respectively. Further, FIG. 1 shows the voltage of operation at the maximum power point Vmpp, a voltage of operation Vol which is lower than Vmpp, and a voltage of operation Voh which is higher than Vmpp. The photovoltaic element may be operated at a voltage close to Vmpp, i.e. close to the maximum power output of the photovoltaic element, and within a voltage range defined by the operation voltages Vol, Voh.

Although the operating voltage of the photovoltaic element may be modified within a voltage range Voh, Vol, the electrical power output of the photovoltaic element may still be close to its maximum value, i.e. as when operated at a voltage Vmpp. The fact that a variation of the operation voltage of a photovoltaic element around Vmpp has a minor impact on the power output of the photovoltaic element is leveraged for the design of a photovoltaic array for operation under non-uniform illumination and with the capability of adjustable voltage output.

Figure 2:
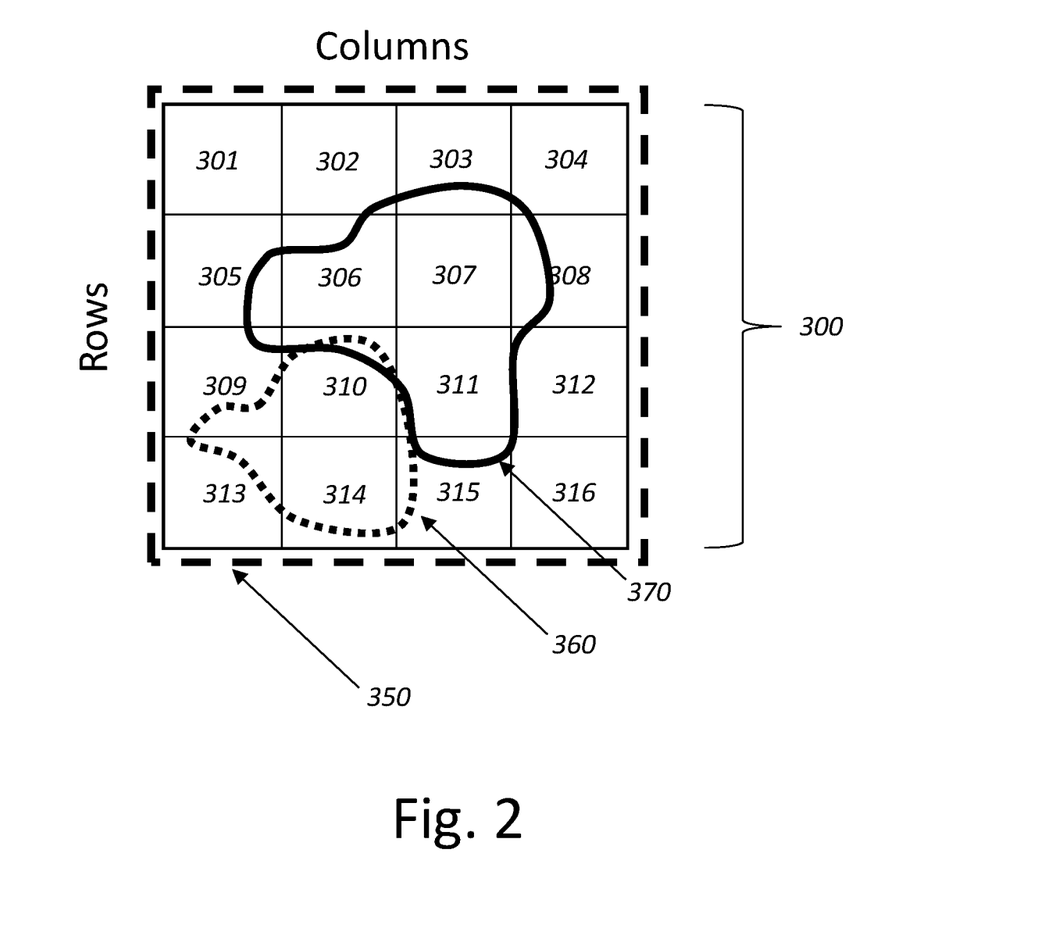
FIG. 2 illustrates a photovoltaic array comprising a plurality of photovoltaic elements, and example distributions of the intensity of an incoming laser beam according to illustrative aspects of the disclosure.

FIG. 2 shows an illustrative photovoltaic array comprising a plurality of photovoltaic elements, and example distributions of the intensity of an incoming laser beam according to illustrative aspects of the disclosure. The photovoltaic array 300 may include a plurality of photovoltaic elements 301, 302, . . . , 316, illustratively arranged in rows and columns.

For clarifying purposes, differences between photovoltaic arrays for long distance laser power beaming, an application of certain aspects of the disclosure, and photovoltaic arrays for utility roof top installation are briefly discussed. Roof top installed photovoltaic arrays generally experience rather homogeneous illumination conditions. As such, the photovoltaic elements usually generate similar photocurrents. This allows the photovoltaic elements of a roof top photovoltaic array to be simply connected in series. For such homogenous illumination conditions, the spatial intensity distribution may be characterized by an envelope 350. The spatial distribution of the intensity of an incoming light beam in applications of disclosure such as laser power beaming may be characterized by an envelope 360 according to some aspects. At a different time according to certain aspects, atmospheric effects or other illumination related effects may lead to a different spatial intensity distribution characterized by an envelope 370. The intensity distribution of laser light at the location of the photovoltaic array 300 may change fairly quickly and move around the photovoltaic array 300.

The difference is that the amount of power available from photovoltaic elements in a photovoltaic array in homogenous illumination conditions is essentially the same among photovoltaic elements because they each receive the same intensity of incoming light. In contrast, in non-uniform (non-homogenous) illumination conditions, the photocurrent generated and the power available among photovoltaic elements is often not predictable. As such, the photocurrent generated among the photovoltaic elements is not the same and varies over time, which also can be referred to as a current mismatch effect. If the photovoltaic elements were simply connected in series, such as in a photovoltaic array for roof top applications, this current mismatch effect would severely degrade the available power output of the photovoltaic array. Further, in a photovoltaic array in which the photovoltaic elements are simply connected in series, the output voltage of the photovoltaic array cannot be dynamically controlled and is fixed as the sum of the voltages of the individual photovoltaic elements within the photovoltaic array. Aspects of the disclosure may account for non-uniform illumination conditions by providing an efficient combination of photovoltaic elements. Further, aspects of the disclosure may provide a dynamically controllable target voltage output of the photovoltaic array by an efficient combination of photovoltaic elements.

Figure 3:
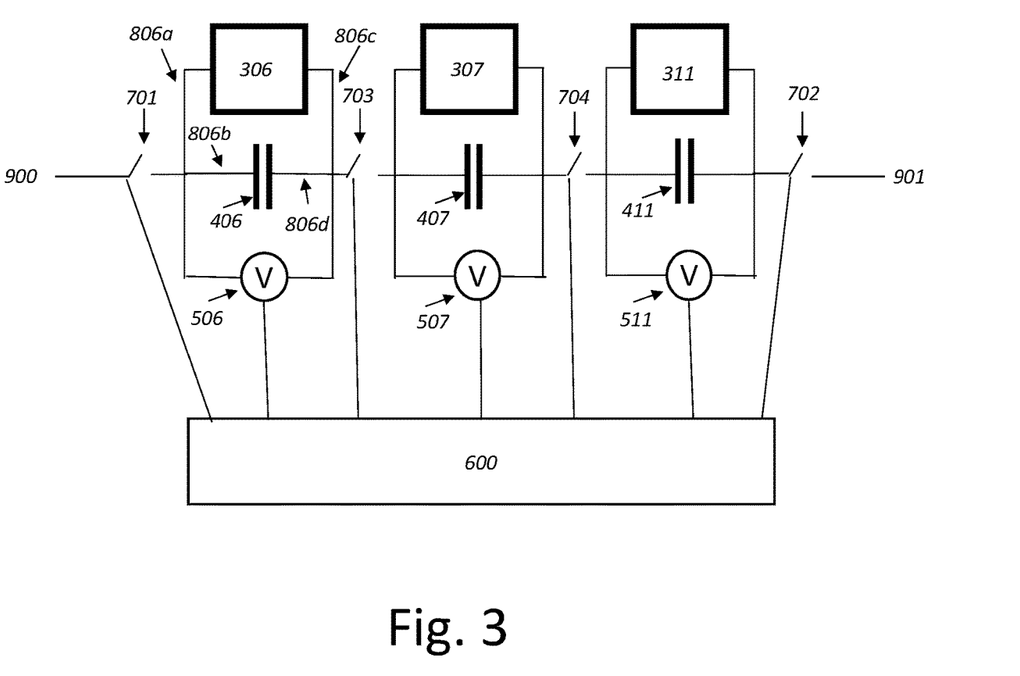
FIG. 3 illustrates an example portion of the photovoltaic array for operation under non-uniform illumination of FIG. 2 according to illustrative aspects of the disclosure.

FIG. 3 shows an illustrative example of the photovoltaic array for operation under non-uniform illumination with adjustable voltage output of FIG. 2 according to aspects of the disclosure. To mitigate the spatial and temporal fluctuations of the incoming light intensity distribution of a laser beam, and to allow for a variable voltage output of the photovoltaic array, one or more of photovoltaic elements 306, 307, 311 may be connected to one or more electrical charge storage elements 406, 407, 411. The electrical charge storage element may be a capacitor, a battery or an otherwise suitable element to store electrical charge and/or electrical energy and may also contain an inductor, or a combination of electrical energy storage elements. The voltage across each respective electrical charge storage element 406, 407, 411 may be measured by a corresponding voltage meter or detector 506, 507, 511, respectively.

The electrical charge storage element 406 may be connected to a photovoltaic element 306 by electrical connectors (e.g., wires) 806a, 806b, 806c, 806d. Under exposure to light, the photovoltaic element 306 can generate a voltage and/or current flow as shown in the I-V curve in FIG. 1 which can be used to charge the electrical charge storage element 406. Efficient charging of a charge storage element, such as charge storage element 406, can be achieved when the voltage of a photovoltaic element (e.g., photovoltaic element 306) is close to the voltage of the maximum power point (Vmpp) or within a range defined by voltages Vol and Voh shown in FIG. 1. A voltage meter (e.g., voltage meter 506) may be used to determine whether the voltage of the photovoltaic element is within the ranged defined by voltages Vol and Voh.

Once the charge storage element 406 has accumulated sufficient electrical charge or electrical energy such that a voltage within the range of Vol and Voh is reached and detected or measured by the voltage meter 506, the electrical charge storage element 406 can be connected by electrical switches 703, 704 to other charge storage elements 407, 411 with a similar voltage measured by their corresponding voltage meters 507, 511, respectively. The sum of the voltages of the individual electrical charge storage elements can be made available at the switches 701, 702 to an external load connected to electrical contacts 900, 901 when the charge storage elements are connected in series.

More than two electrical charge storage elements can be connected in series. The number of electrical charge storage elements connected in series and/or in parallel may depend on the desired voltage output and/or the maximum current output capability at the electrical contacts 900, 901.

When a certain amount of electrical charge has flowed through an electrical load connected to the electrical contacts 900, 901, the electrical charge storage elements may be discharged, as can be measured by voltage meters 506, 507, 511, and the voltage across the electrical contacts 900, 901, which can be calculated as the sum of the voltages measured by voltage meters 506, 507, 511, may fall below and/or reach a certain threshold value. Then, the electrical switches 701, 702, 703 and 704 may be opened, and a second combination of photovoltaic elements and charged electrical charge storage elements that have the requisite voltage level may be selected and may be connected to the electrical contacts 900, 901. It will be appreciated that the second combination of photovoltaic elements and electrical charge storage elements may have a higher voltage than the initial combination of selected photovoltaic elements and electrical charge storage elements.

The second combination of selected photovoltaic elements and electrical storage elements may be chosen according to the desired voltage output, the voltage across their individual electrical charge storage elements, or by another suitable method.

A controller 600 may be connected to the voltage meters 506, 507, 511, and to the switches 701, 702, 703, 704. The controller 600 may comprise an application specific circuit for executing software and/or hardware instructions to, for example, control various switches to connect a combination of photovoltaic elements and electrical storage elements. In another example, the controller 600 may comprise a processing unit and one or more storage units (e.g., memories) for storing executable instructions to, for example, control various switches to connect a combination of photovoltaic elements and electrical storage elements. In one example, according to the instructions, the controller 600 may read the voltage meters 506, 507, 511, and according to the measured voltage values may control the electrical switches such that a desired output voltage can be made available at the electrical contacts 900, 901. The controller 600 may be configured to select possible combinations of photovoltaic elements and electrical charge storage elements to provide power and desired output voltages to an external load. It will be appreciated that the controller 600 although only illustrated as being connected to the voltage meters and electrical switches depicted in FIG. 3 may be connected to the voltage meters and electrical switches of each photovoltaic element in the photovoltaic array 300 and control them similarly.

A photovoltaic element and a connected electrical charge storage element may reach a voltage within a range Vol, Voh more quickly when more light is absorbed by the photovoltaic element. Once such a voltage range is reached, the controller 300 may select a photovoltaic element and electrical charge storage element to be connected in series with other selections of photovoltaic elements and electrical charge storage elements. Such a series connection generally results in a higher output voltage which can be made available to an external load. The controller 600 may select a photovoltaic element and electrical charge storage element to be connected in parallel with other selections of photovoltaic elements and electrical charge storage elements as needed to obtain and supply requisite power and output voltages. Such a parallel connection generally results in a higher output current capability while the output voltage remains nearly constant.

Figure 4:
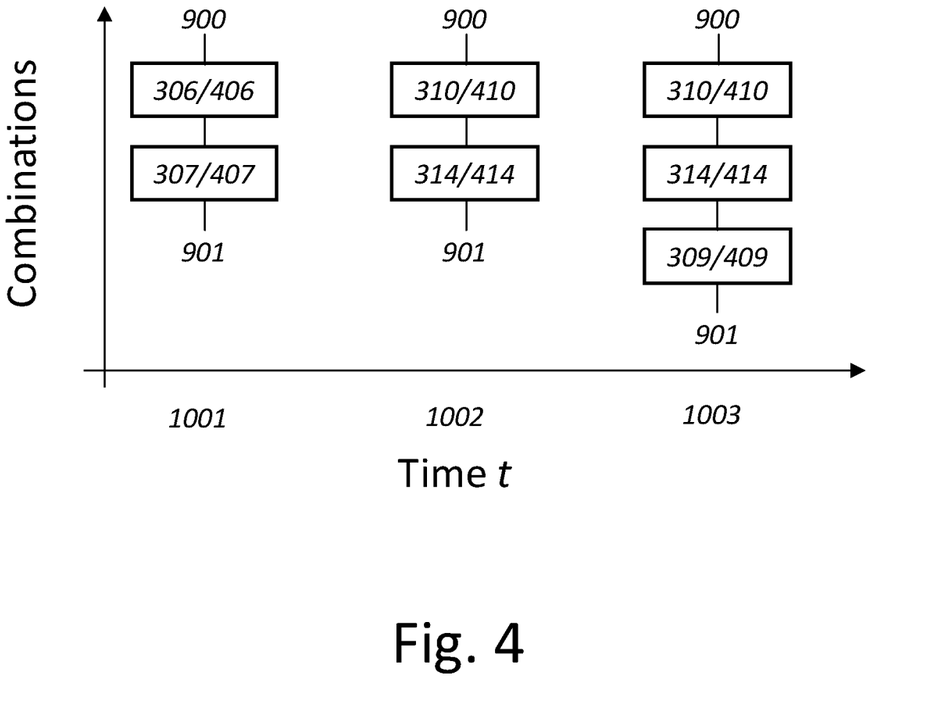
FIG. 4 illustrates a combination of different electrical charge storage elements (from FIG. 2) vs time, according to illustrative aspects of the disclosure.

FIG. 4 shows combinations of different photovoltaic elements and electrical charge storage elements vs time according to illustrative aspects of the disclosure. Possible selections of combinations of photovoltaic elements and electrical charge storage elements selected by the controller 600 (not shown in FIG. 4) to provide power to an external load are illustrated in FIG. 4. The selection of photovoltaic elements and connected electrical charge storage elements is made with reference to the labeling scheme of columns and rows in FIG. 2. It will be appreciated that FIG. 4 is an example and that any combination of photovoltaic elements may be connected with each other as long as they meet the requisite voltage level. For example, the three non-contiguous photovoltaic elements may be connected with other. The controller 600 may evaluate the voltage of each of the photovoltaic elements in FIG. 2 and select an appropriate combination of photovoltaic elements to satisfy the requisite power level and output voltage.

At time 1001, the controller 600 may select a first combination in which a first photovoltaic element 306 with a connected electrical charge storage element 406 may be connected to a second photovoltaic element 307 with a connected electrical charge storage element 407, with the first selected combination connected to an electrical load 900, 901 as shown in FIG. 4.

According to one illustrative aspect, at a time 1002, after a certain amount of electrical charge has flowed through an electrical load connected to the electrical contacts 900, 901, and the electrical charge storage elements may have been discharged, and the voltage across the electrical contacts 900, 901 may have fallen below and/or reached a certain threshold value, the controller 600 may select a new combination. For example, at time 1002, the controller 600 may select a second combination in which a third photovoltaic element 310 with a connected electrical charge storage element 410 may be connected to a fourth photovoltaic element 314 with a connected electrical charge storage element 414, with the second selected combination connected to an electrical load 900, 901 as illustrated in FIG. 4.

In another example, at time 1003, a connected electrical load may require a higher voltage output than being provided by the current combination. To achieve a higher voltage output, the controller 600 may add another photovoltaic element 309 with a connected electrical charge storage element 409. At time 1003, the first photovoltaic element 306 with a connected electrical charge storage element 406 is not connected to the electrical load 900, 901, and may be recharging the electrical charge storage element 406 connected thereto. When photovoltaic elements with connected electrical charge storage elements are not connected to the electrical load, the photovoltaic elements may be recharging the electrical storage elements connected thereto.

Figure 5:
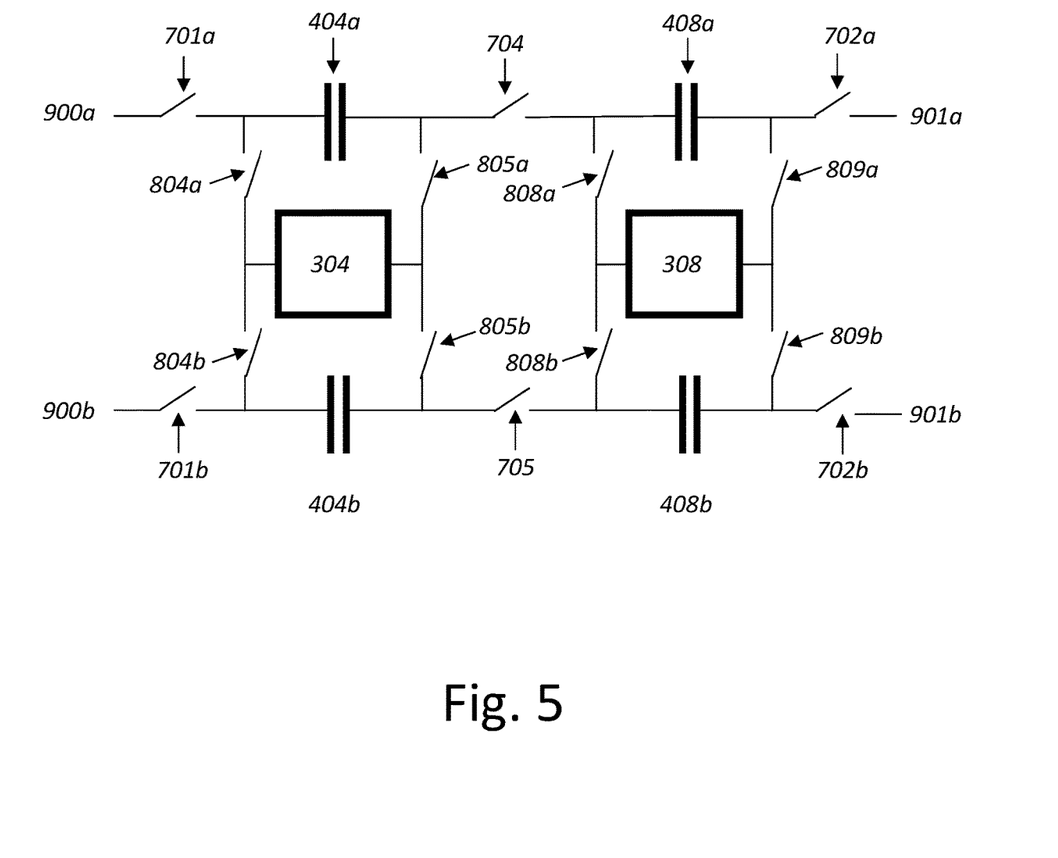
FIG. 5 illustrates a plurality of photovoltaic elements connected to electrical wires, electrical switches, and electrical charge storage elements according to illustrative aspects of the disclosure.

FIG. 5 shows another illustrative embodiment of a photovoltaic array for operation under non-uniform illumination with adjustable voltage output according to illustrative aspects of the disclosure. In FIG. 5, two or more electrical charge storage elements 404a, 404b may be connected to a photovoltaic element 304 via electrical switches 804a, 805a, 804b, 805b. The electrical charge storage elements 404a, 404b may be charged by the photovoltaic element 304 simultaneously or sequentially. Whether the electrical charge storage elements 404a, 404b are connected to the photovoltaic element 304 may be controlled by a controller (not shown like the controller 600 described in connection with at least FIG. 3), which controls the state of the electrical switches 804a, 805a, 804b, 805b.

A load may be connected to a first electrical output 900a, 901a and/or a second electrical output 900b, 901b. To form a first combination, once a desired voltage across a first selection of a first photovoltaic element 304 and a first electrical charge storage element 404b is reached, the controller can cause the first selection to be connected in series by electrical switch 705 to a second selection of a second photovoltaic element 308 and a second charge storage element 408b, and by switches 701b, 702b to an electrical load connected to electrical contacts 900b, 901b.

At a different time, an electrical load may be connected to electrical contacts 900a, 901a, with electrical switches 701a, 702a, 704 closed. With the electrical switches 804a, 805a, 808a, 809a open, the electrical load is connected to the electrical charge storage elements 404a, 408a. With the electrical switches 804b, 805b, 808b, 809b closed, the photovoltaic elements 304, 308 can simultaneously charge the electrical charge storage elements 404b, 408b.

Figure 6:
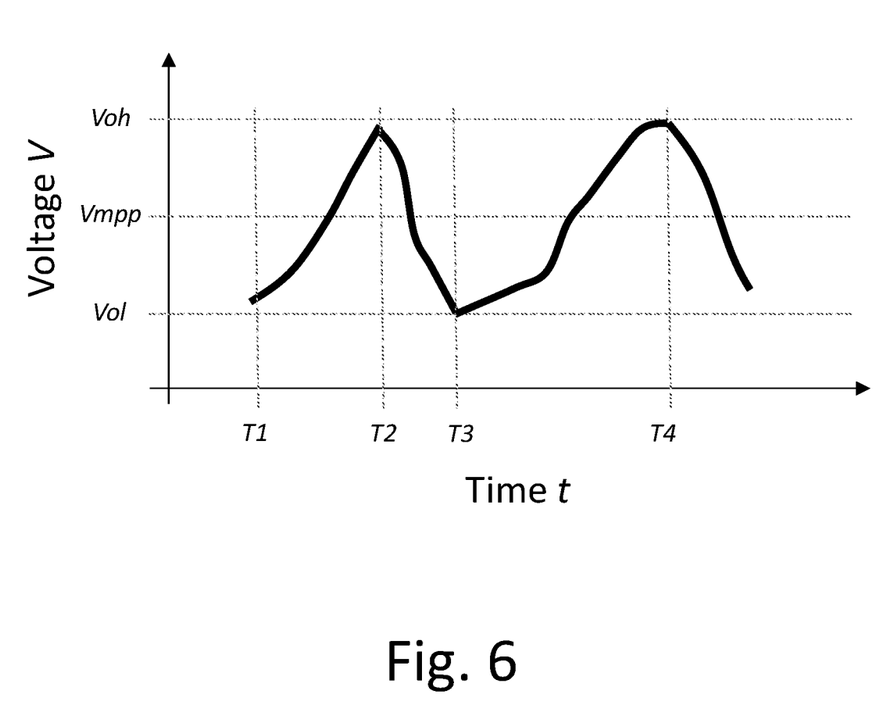
FIG. 6 illustrates the voltage vs time characteristics of voltage across a an electrical charge storage element according to illustrative aspects of the disclosure.

FIG. 6 shows the voltage across an electrical charge storage element vs time according to illustrative aspects of the disclosure.

At time T1, the voltage across an electrical charge storage element may be a voltage Vol. Under exposure to light, a photovoltaic element can charge an electrical charge storage element such that at time T2 a voltage Voh is reached. The electrical charge storage element may then be connected to an electrical load and discharged until time T3. From time T2 until T3, electrical charge or electrical energy initially stored in the electrical charge storage element may flow through the electrical load, such that at time T3 the voltage across the electrical charge storage element may then approach the voltage Vol. The electrical charge storage element may then be disconnected from the electrical load and re-charged by a photovoltaic element and/or another electrical charge storage element until a voltage Voh across the electrical charge storage element is reached at time T4. The electrical charge storage element may then be connected to an electrical load at time T4. The electrical charge storage element may also not be connected to an electrical load at time T4. Instead, the electrical charge or electrical energy may be stored until a later time when the electrical charge storage element is connected to a load. The controller 660 may determine at what time an electrical charge storage element may be connected to an electrical load and how many of the electrical charge storage elements may be connected to an electrical load whether it be in series or parallel based on the voltage requirements.

Figure 7:
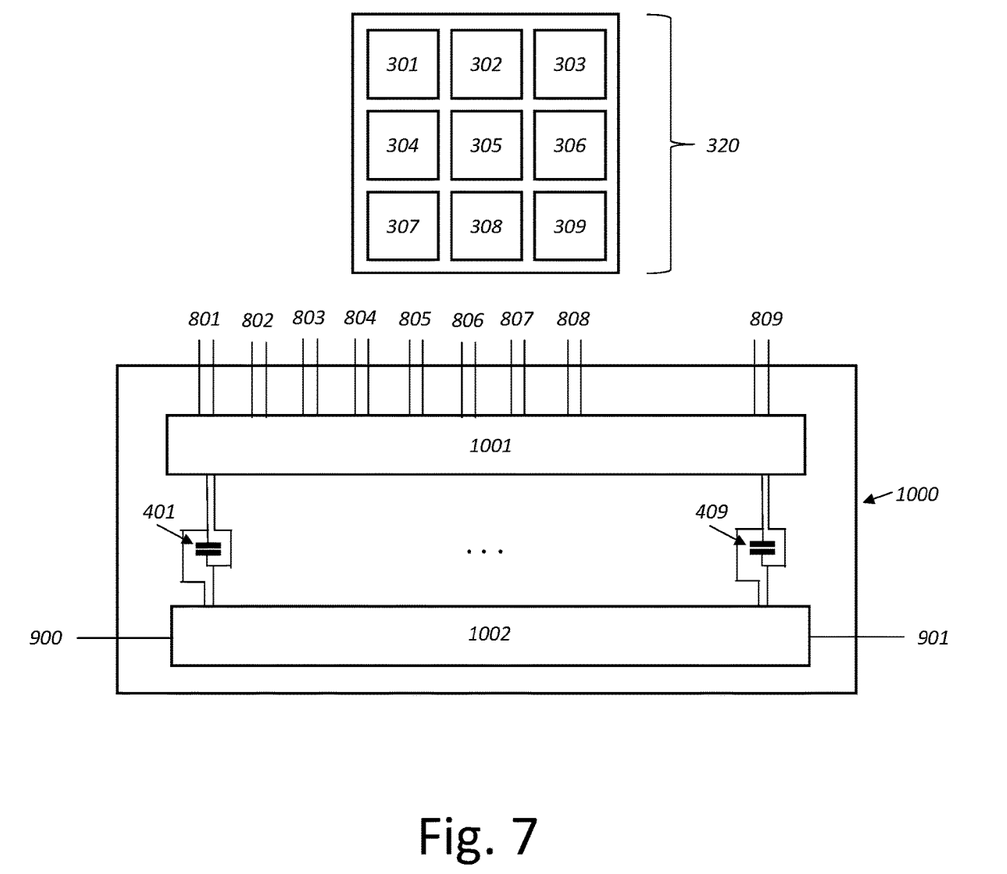
FIG. 7 illustrates a photovoltaic array comprising a plurality of photovoltaic elements; and a multiplexer element comprising electrical charge storage elements, electrical connectors, and sub-multiplexer elements according to illustrative aspects of the disclosure.

FIG. 7 shows a photovoltaic array comprising a plurality of photovoltaic elements; and a multiplexer element comprising electrical charge storage elements, electrical connectors, and sub-multiplexer elements according to illustrative aspects of the disclosure.

A photovoltaic array 320 may include at least two photovoltaic elements 301, 302, 303, 304, 305, 306, 307, 308, 309 illustratively arranged in rows and columns. A multiplexer element 1000 may comprise electrical connectors 801, 802, 803, 804, 805, 806, 807, 808, 809. An electrical connector 801 may be coupled to a photovoltaic element 301 in the photovoltaic array 320. An electrical connector 809 may be coupled to a photovoltaic element 309. Each electrical connector in the multiplexer element 1000 may be coupled to a different photovoltaic element in the photovoltaic array 320.

The multiplexer element 1000 may further include at least two electrical charge storage elements 401, . . . , 409 and two sub-multiplexer elements 1001, 1002. A sub-multiplexer element 1001 may electrically connect one of the electrical connectors 801, 802, 803, 804, 805, 806, 807, 808, 809 to one or more of the electrical charge storage elements 401, . . . 409. The one or more electrical charge storage elements may be charged by a photovoltaic element until a voltage within a range Voh, Vol is reached. The sub-multiplexer element 1001 may be configured such that different charge storage elements may be charged simultaneously by establishing an electrical connection to a different electrical connector element. Once an electrical charge storage element has reached a voltage within a range Voh, Vol it may be electrically disconnected from the sub-multiplexer element 1001. A controller (not shown, but similar to the controller 600 shown and described above) may be connected to the multiplexer 1000 and particularly the sub-multiplexer elements 1001, 1002 to control which one of the electrical connectors 801, 802, 803, 804, 805, 806, 807, 808, 809 is connected to which of the one or more electrical storage elements 401, . . . 409.

A selection of the electrical charge storage elements may be connected by a second sub-multiplexer element 1002 in series and/or in parallel and then connected to the electrical load connectors 900, 901 such that a desired output voltage across the electrical load connectors 900, 901 is reached. This may be facilitated by the controller. The second sub-multiplexer 1002 may be configured such that the selection and/or amount and/or order of electrical charge storage elements which are connected in series and/or in parallel to the electrical load connectors 900, 901 can be changed at a specific time T1, T2 and/or Tn by, for example, the controller whereas the selection, amount and/or order may be random, selected by an order of voltages across the electrical charge elements, selected by the controller according to requirements defined by the electrical load, or as otherwise suitable.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

The description above describes various features and functions of the disclosed systems, devices, and methods with reference to the accompanying Figures. While various aspects and embodiments have been disclosed herein, other aspects and embodiments will be apparent. For example, features described herein with relationship to certain aspects may be combined with features described with relationship to other aspects. The various aspects and embodiments disclosed herein are for purposes of illustration and are not intended to be limiting with the true scope and spirit being indicated by the following claims.

What is claimed is:

1. A method for optical to electrical energy conversion by a photovoltaic array under non-uniform illumination, wherein the photovoltaic array comprises a plurality of photovoltaic elements, each photovoltaic element being associated with at least one corresponding electrical charge storage element, the method comprising the steps of:
connecting a first electrical charge storage element to a first photovoltaic element;
charging, by the first photovoltaic element, the first electrical charge storage element to a first voltage;
determining that the first voltage is within a defined range across the first electrical charge storage element;
connecting a second electrical charge storage element to a second photovoltaic element;
charging, by the second photovoltaic element, the second electrical charge storage element to a second voltage;
determining that the second voltage is within a defined range across the second electrical charge storage element;
connecting the first electrical charge storage element to the second electrical charge storage element such that a voltage across the first electrical charge storage element and the second electrical charge storage element is at least:
a sum of the first voltage across the first electrical charge storage element and the second voltage across the second electrical charge storage element; and
coupling the connected first electrical charge storage element and the second electrical charge storage element to an electrical load.

2. The method of claim 1, wherein the first electrical charge storage element and the second electrical charge storage element is comprised of at least one of the following: a capacitor, a battery, or an inductor.

3. The method of claim 1, wherein the second electrical charge storage element comprises a combination of electrical charge storage elements, which are configured to be both sequentially or simultaneously charged by the second photovoltaic element, and wherein the method further comprises:
determining to charge, by the second photovoltaic element, the electrical charge storage elements in the combination sequentially or simultaneously to obtain a voltage within a desired voltage output range; and
providing the voltage to the electrical load.

4. The method of claim 1, wherein the first photovoltaic element and the second photovoltaic element are non-contiguously disposed in the photovoltaic array.

5. The method of claim 1, wherein the first photovoltaic element and the second photovoltaic element are disposed in the photovoltaic array in different rows and different columns from each other.

6. The method claim 1, comprising:
after connecting the first electrical charge storage element to the second electrical charge storage element,
determining that the first electrical charge storage element and the second electrical charge storage element are no longer able to continue providing a voltage amount sufficient for the electrical load;
decoupling the first electrical charge storage element and the second electrical charge storage element from the electrical load;
connecting a third electrical charge storage element to a fourth electrical charge storage element such that a voltage across the third electrical charge storage element and the fourth electrical charge storage element is at least one of the following:
a sum of a third voltage across the third electrical charge storage element and a fourth voltage across the fourth electrical charge storage element, or
higher than an initial level of the first voltage across the first electrical charge storage element and the second voltage across the second electrical charge storage element; and
coupling the connected third electrical charge storage element and the fourth electrical charge storage element to the electrical load.

7. A system for optical to electrical energy conversion of a photovoltaic array under non-uniform illumination, the system comprising:
a photovoltaic array comprising a plurality of photovoltaic elements including:
a first photovoltaic element configured to generate a first voltage and an electrical charge flow; and
a second photovoltaic element configured to generate a second voltage and an electrical charge flow;
a first electrical charge storage element configured to be charged by the first photovoltaic element when connected thereto;
a second electrical charge storage element configured to be charged by the second photovoltaic element when connected thereto;
a first voltage detector configured to determine whether the first voltage is within a defined range across the first electrical charge storage element;
a second voltage detector configured to determine whether the second voltage is within a defined range across the second electrical charge storage element;
a controller configured to:
connect the first electrical charge storage element to the first photovoltaic element;
connect the second electrical charge storage element to the second photovoltaic element; and
cause the first electrical charge storage element to be connected to the second electrical charge storage element in a case that the first voltage is within the defined range across the first electrical charge storage element and the second voltage is within the defined range across the second electrical charge storage element, wherein a voltage across the first electrical charge storage element and the second electrical charge storage element is at least:
a sum of the first voltage across the first electrical charge storage element and the second voltage across the second electrical charge storage element; and
cause the connected first electrical charge storage element and the second electrical charge storage element to be connected to an electrical load.

8. The system of claim 7, wherein the first electrical charge storage element and the second electrical charge storage element is comprised of at least one of the following: a capacitor, a battery, or an inductor.

9. The system of claim 7, wherein the second electrical charge storage element comprises a combination of electrical charge storage elements, which are configured to be both sequentially or simultaneously charged by the second photovoltaic element, and wherein the controller is further configured to:
cause the electrical charge storage elements in the combination to sequentially or simultaneously charge, based on a desired voltage output range, to obtain a
voltage within the desired voltage output range; and
cause the voltage to be provided to the electrical load.

10. The system of claim 7, wherein the first photovoltaic element and the second photovoltaic element are non-contiguously disposed in the photovoltaic array.

11. The system of claim 7, wherein the first photovoltaic element and the second photovoltaic element are disposed in the photovoltaic array in different rows and different columns from each other.

12. The system of claim 7, wherein the controller is further configured to:
after the first electrical charge storage element has been connected to the second electrical charge storage element,
determine that the first electrical charge storage element and the second electrical charge storage element are no longer able to continue providing a voltage amount sufficient for the electrical load;
cause the first electrical charge storage element and the second electrical charge storage element to be disconnected from the electrical load;
cause a third electrical charge storage element to be connected to a fourth electrical charge storage element such that a voltage across the third electrical charge storage element and the fourth electrical charge storage element is at least one of the following:
a sum of a third voltage across the third electrical charge storage element and a fourth voltage across the fourth electrical charge storage element, or
higher than an initial level of the first voltage across the first electrical charge storage element and the second voltage across the second electrical charge storage element; and
causing the connected third electrical charge storage element and the fourth electrical charge storage element to be coupled to the electrical load.

* * * * *